Aug. 15, 1967 HISASHI KANEKO 3,336,589

NONLINEAR DECODING DEVICE

Filed Feb. 4, 1964 2 Sheets-Sheet 1

Inventor
H. KANEKO
By [signature]
Attorney

Inventor
H. Kaneko
By R P Morris
Attorney

United States Patent Office 3,336,589
Patented Aug. 15, 1967

3,336,589
NONLINEAR DECODING DEVICE

Hisashi Kaneko, Tokyo, Japan, assignor to Nippon Electric Company, Limited, Tokyo, Japan, a corporation of Japan Filed Feb. 4, 1964, Ser. No. 342,470
Claims priority, application Japan, Feb. 18, 1963, 38/8,208
4 Claims. (Cl. 340—347)

Figure 1:
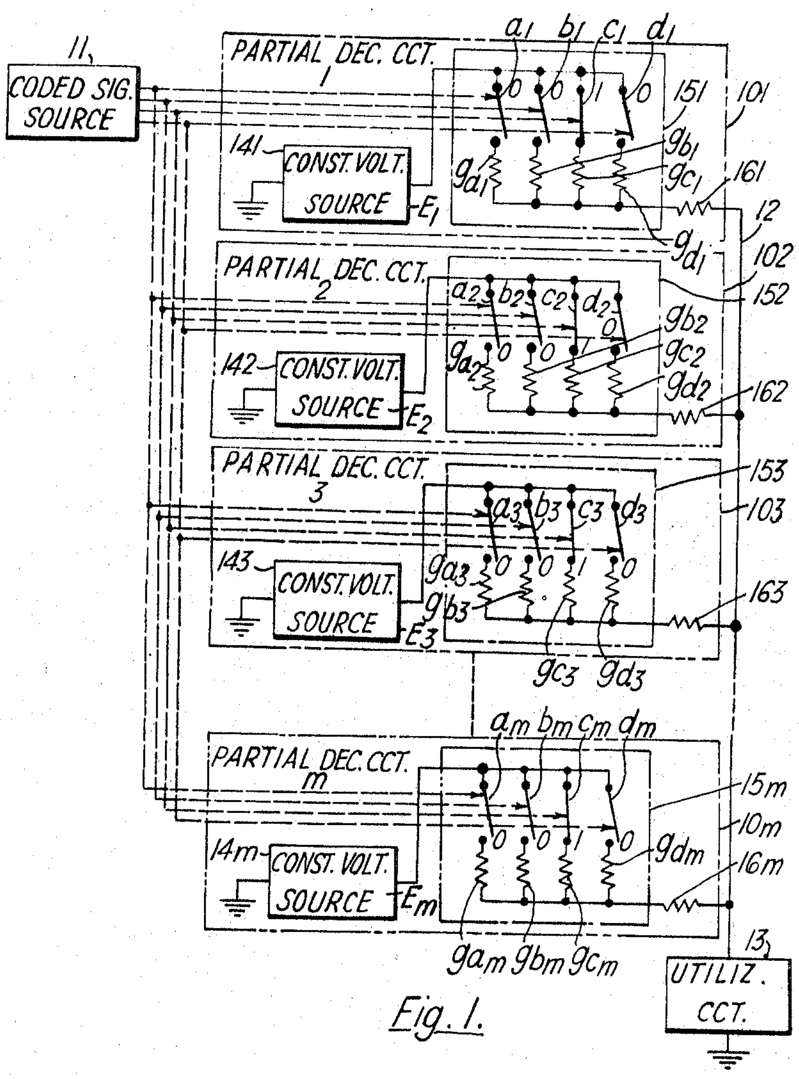

This invention relates to a decoder used in pulse-code-modulation (PCM) communication and a digital-analogue converter whereby it is possible to convert digital signals into analogue signals with non-linear quantization or companding characteristics, and consequently relates to an encoder used in PCM communication and an analogue-digital converter of the feedback or a similar type wherein such a digital-analogue converter is used as the local decoder.

The conversion into digital signals by sampling, quantizing, and encoding analogue signals representing analogue quantities such as voice, picture, data, or others, presents excellent technical merits such as increased insusceptibility to noise of the transmission and handling of information. Although analogue signals or sampled analogue signals have generally been quantized with equal quantization steps, some types of analogue signals, such as voice signals in which signals of smaller amplitude occur frequently when viewed in the light of probability, are preferably quantized with minor quantization steps for signals of smaller amplitudes as compared with quantization steps for signals of larger amplitudes. For such non-linear quantization, analogue signals are first compressed by an instantaneous compandor, in which the inherent non-linearity of non-linear circuit elements such as semiconductor devices or vacuum tubes are utilized, and then quantized linearly. With such non-linear quantization, whose characteristics depend on the inherent non-linearity of non-linear circuit elements, it has been impossible to obtain uniform non-linear quantization or companding characteristics because of the temperature dependency and variations of the inherent non-linearities.

In order to remove the above-mentioned defects of the conventional non-linear encoders and decoders, proposals have been made of a decoder with logarithmic companding characteristics, one with a hyperbolic companding characteristic, and others, that comprises switches operable in response to the code elements of a digital signal and passive networks composed of passive circuit elements such as resistors. The decoder with a logarithmic companding characteristic, which is described, for example, in my co-pending application S.N. 314,765, filed on Oct. 8, 1963, entitled "Decoding Circuit with Nonlinear Companding Characteristics," comprises a constant-voltage power source and a plurality of resistor-attenuators which are connected in series each to the one preceding and to the power source, and the attenuation ratios of which are controlled by the code elements of a digital signal so that the decoder may provide a logarithmically-companded analogue voltage signal. As regards the decoder with a hyperbolic companding characteristic, reference should be made, if necessary, to the article: "Coding by Feedback Methods" by B. D. Smith, published in the Proc. I.R.E., vol. 41, pp. 1053–1058, August 1953.

In these prior-art decoders with non-linear companding characteristics, the arrangement is such that the total impedance of the passive networks may vary in response to a given digital signal and consequently that the decoded output may be obtained by an open-circuit voltage. Therefore, these decoders are not preferable in case the decoded output utilization circuit connected to the output terminal of the decoder is a transistorized or other low-input-impedance circuit.

Furthermore, it has already been pointed out that the known non-linear companding characteristics cannot sufficiently improve the signal-to-quantization-noise ratio of the decoder or encoder. Current research has revealed that the non-linear companding characteristic by which it will become possible to sufficiently improve the signal-to-quantization-noise ratio, naturally varies with the nature of the signals to be handled and with the desired over-all characteristics. Therefore, let it be assumed in this specification that the signals in question are telephone signals of the frequency band ranging from 0.3 kc. to 3 kc. and that the desired over-all characteristic is one that has the highest signal-to-quantization-noise ratio possible. In addition, research has not yet given the theoretical generic formula for the non-linear companding characteristic which gives the maximum signal-to-quantization-noise ratio but have empirically shown that the higher ratio is obtained with higher-order non-linear companding characteristics. However, it is not feasible to furnish prior-art decoders and encoders with higher-order non-linear companding characteristics.

A generic object of this invention is therefore to provide a non-linear decoder with an improved signal-to-quantization-noise ratio.

A specific object of the invention is to provide a non-linear decoder whose companding characteristic may easily be possessed of a higher-order characteristic.

Another object of the invention is to provide a non-linear decoder for producing the decoded output as a short-circuit current.

This invention is based on the fact that it is relatively easier to provide a higher-order non-linear companding characteristic with decoders with hyperbolic characteristics which produce the decoded output as a short-circuit current, than decoders with non-linear companding characteristics of other types. Furthermore, the invention utilizes the fact that a decoder with a hyperbolic companding characteristic can be designed without any serious restriction imposed by the contact resistance of the switches used in the so-called weighted-impedance-switch network and that the weighted-impedance-switch network can be designed with ease because it is possible to arrange the contact pairs of a plurality of the switches used therein so that they are not connected in series relative to one another when seen from the ground.

In principle, a decoder of this invention comprises: a plurality of partial decoder circuits, each of which in turn comprises a constant-voltage power source connected to the ground at one end, a linearly-variable-admittance network connected to the other end of said power source and adapted to respond in a manner to be later described to a coded input signal or an imput digital signal supplied in common to the digital-signal input terminals of said partial decoder circuits, and a fixed admittance network connected to said linearly-variable admittance network; a common wiring connecting the output terminals of said partial decoder circuits; and an output circuit or decoded output utilization circuit interposed between said common wiring and the ground; whereby the sum of the decoded outputs of said partial decoder circuits may be obtained as a decoded output signal in said utilization circuit. In case the decoder is used as the local decoder of a feedback-type encoder for voice, television, and other signals which assume both positive and negative values, it is possible to arrange the partial decoder circuits in pairs, in each of which pairs the partial decoder circuits are controlled in complementary relation to each other in a manner or sense to be explained later.

Figure 2:
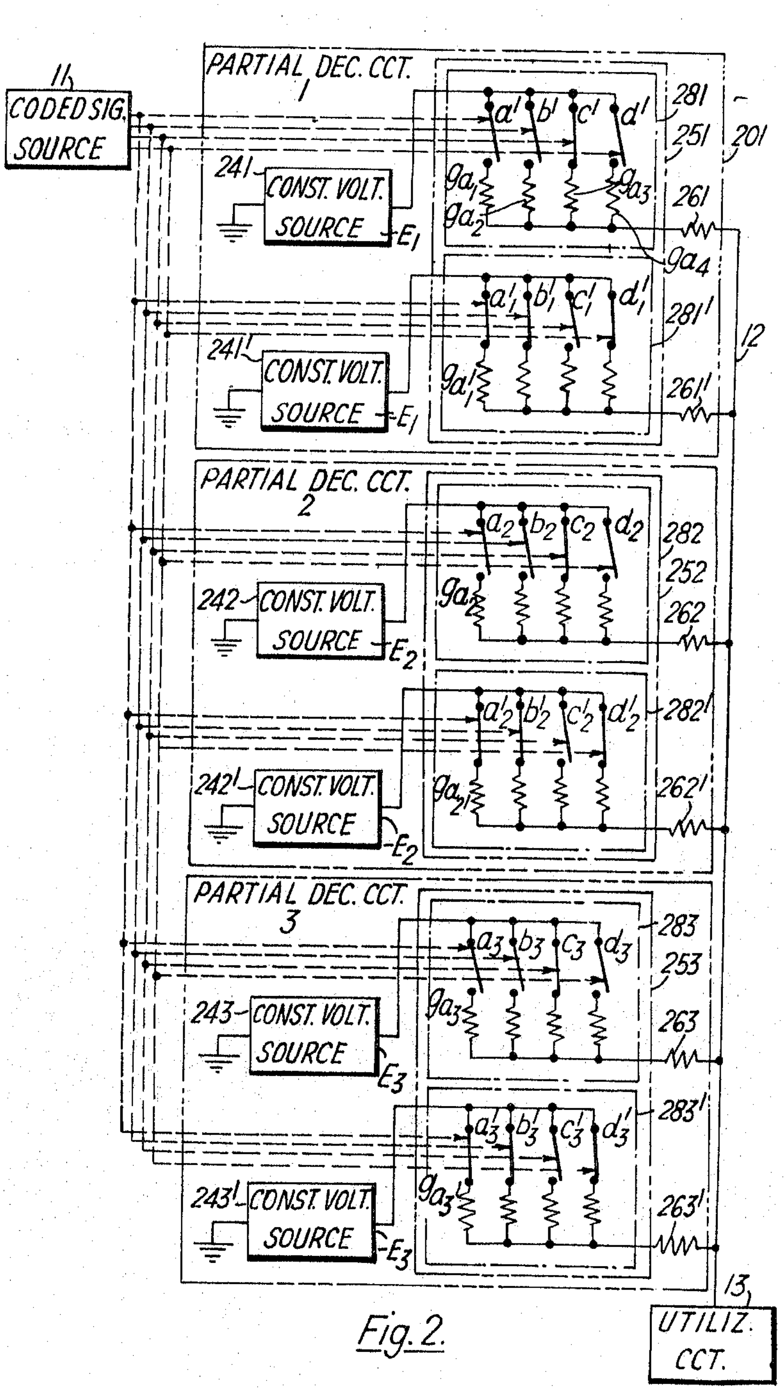

The above-mentioned and other features and objects of this invention and the means of attaining them will become more apparent and the invention itself will be best understood by reference to the following description of embodiments of the invention taken in conjunction with the accompanying drawings in which:

FIG. 1 shows the circuit, partly in blocks, of a fundamental embodiment of this invention; and FIG. 2 shows the circuit, partly in blocks, of a preferred embodiment of the invention.

Referring to FIG. 1, a decoder of the invention comprises: a first, a second, . . ., and an *m*th partial decoder circuit 101, 102, . . ., and **10*m* whose digital-signal input terminals are all connected to a coded signal input source or signal source 11 of the digital signal to be decoded; a common wiring 12 connecting all the signal output terminals of the partial decoder circuits 101, 102, . . ., and 10*m*; and a low-input-impedance decoded output signal utilization circuit 13 connected to the common wiring 12. More particularly describing the partial decoder circuit 101 as an example of such circuits 101–10*m*, the circuit 101 comprises: a constant-voltage power source 141 connected to the ground at one end or other point of reference potential; a variable admittance network 151 connected at its current input terminal to the other end of the power source 141; and a fixed admittance network 161, one end of which is connected to the current output terminal of the variable admittance network 151 and the other end of which is connected to the common wiring 12. The variable admittance network 151 which serves as the so-called weighted-impedance-switch network comprises: fixed admittance elements $g_{a1}$, $g_{b1}$, $g_{c1}$, and $g_{d1}$ which equal in number the digits of the binary digital signal to be decoded, each of which is connected at one end to the fixed admittance network 161, and all of which are provided with fixed weighted admittances $g_1$, $2_{g1}$, $2^2{}_{g1}$, and $2^3{}_{g1}$, respectively; and electromagnetic or other switches $a_1$, $b_1$, $c_1$, and $d_1$ for selective connection and disconnection of the free ends of the fixed admittance elements $g_{a1}$, $g_{b1}$, $g_{c1}$, and $g_{d1}$ to the power source 141 according as the corresponding binary code elements ($e_1$, $e_2$, $e_3$, $e_4$) presumed in this case to be four in number and supplied thereto from the signal source 11 are either binary one or zero, respectively. For example, in case the supplied binary codeword ($e_1$, $e_2$, $e_3$, $e_4$) is (0010), the third switch $c_1$ alone is closed and the remaining switches $a_1$, $b_1$, and $d_1$ are left open, so that the resultant admittance of the variable admittance network 151** may become $2^2{}_{g1}$. To generalize, it will be seen that inasmuch as the digital quantity $j$ represented by the input codeword ($e_1$, $e_2$, $e_3$, $e_4$) is given by the formula $$j=\sum_{k=1}^{4} e_k \cdot 2^{k-1} \tag{1}$$

the resultant admittance $g_{P1}$ of the variable admittance network 151 is given by the equation $$g_{P1}=\sum_{k=1}^{4} e_k \cdot g_1{}^k \cdot 2^{-1}=g_1 \cdot j \tag{2}$$

which shows that the resultant admittance $g_{P1}$ is linearly proportional in discrete steps to the digital quantity $j$ represented by the codeword ($e_1$, $e_2$, $e_3$, $e_4$). Consequently, the variable admittance network 151 may be termed a linearly-variable-admittance network. Incidentally, it should be noted here that if the fixed admittance of the fixed admittance network 161 is denoted by $G_1$, the over-all admittance $Y_1$ of the variable and the fixed admittance networks 151 and 161 of the first partial decoder circuit 101 is given by $$Y_1=\frac{G_1 \cdot g_{P1}}{G_1+g_{P1}}=\frac{G_1 \cdot g_1 \cdot j}{G_1+g_1 \cdot j}=\frac{G_1 \cdot j}{G_1/g_1+j} \tag{3}$$

and that the second and the following partial decoder circuits 102, . . ., and **10*m*** are of similar construction and have similar over-all admittances $Y_2$, . . ., and $Y_m$, respectively.

In case the power sources 141, 142, . . ., and **14*m* provide substantially equal voltages $E=E_1=E_2=\ldots=m$ so as allow to assume that the current input terminals of the variable admittance networks 151, 152, . . ., and 15*m* are in equivalence connected to a common constant-voltage power source of the output voltage E and in case the input admittance of the utilization circuit 13 is substantially infinitely high, then the over-all admittance $Y_S$ of the variable and the fixed admittance networks 151, 161, 152, 162, . . ., 15*m*, and 16*m*** is given by the equation $$=\frac{G_1 \cdot j}{G_1/g_1+j}+\frac{G_2 \cdot j}{G_2/g_2+j}+\cdots+\frac{G_m \cdot j}{G^m/g_m+j} \tag{4}$$

which is a linear combination of hyperbolas, $m$ in number, and represents an $m$th-order hyperbolic relation between the input digital quantity $j$ and the output decoded signal. It will thus be appreciated that it is easy to provide a higher-order hyperbolic companding characteristic by increasing the number $m$ of the partial decoder circuits.

As has been mentioned in the preamble to the specification, the fundamental embodiment of the invention so far described with reference to FIG. 1 can serve as a local decoder in a feedback-type encoder. It is to be understood, however, that in case the analogue signals to be dealt with are those which assume the positive and the negative values, as in the voice signal, the television video signal, or the like, then it is preferable to provide the decoder with a companding characteristic given by an odd function by arranging the weighted-impedance-switch networks of the decoder in pairs in a manner to be explained in the following, in each pair of which the weighted-impedance-switch networks are controlled in complementary relation to each other by the input digital quantity.

Referring now to FIG. 2, a preferred embodiment of this invention shown therein with similar parts designated by the same reference symbols as in FIG. 1, comprises: a first, a second, and a third partial decoder circuit 201, 202, and 203 whose signal input terminals are all connected to a signal source 11 of the digital signal to be decoded; a common wiring 12 connecting all the signal output terminals of the partial decoder circuits 201, 202, and 203; and a low-input-impedance decoded output utilization circuit 13 connected to the common wiring 12. More particularly describing the partial decoder circuits 201–203, the circuit 201, for example, comprises: constant-voltage power sources 241 and 241′ for providing electromotive forces $E_1$ and $-E_1$ between the ends connected to the ground or other point of reference potential, and the other ends thereof; a complementarily operable admittance network pair 251, composed of two linearly-variable-admittance networks 281 and 281′ which serve as weighted-impedance-switch networks and which are connected at their current input terminals to the above-mentioned ungrounded ends of the respective power sources 241 and 241′; and two fixed admittance networks 261 and 261′ which are connected at their ends on the one side to the respective current output terminals of the admittance networks 281 and 281′ and at both the other ends to the common wiring 12. Switch pairs $a_1$, $a_1'$; $b_1$, $b_1'$; $c_1$, $c_1'$; and $d_1$, $d_1'$ of the admittance networks 281 and 281′ are controlled in complementary relation to each other in each pair by the corresponding code elements of the input binary codeword ($e_1$, $e_2$, $e_3$, $e_4$). For example, a codework (0010) disposes, in the manner illustrated in FIG. 2, the switches $a_1$, $b_1$, $c_1$, and $d_1$ of the linearly-variable-admittance network 281 in the "1," "1," "0," and "1" states, respectively, and the switches $a_1'$, $b_1'$, $c_1'$, and $d_1'$ of the paired or complementarily variable admittance network 281′ in the "0," "0," "1," and "0" states, respectively. Generally speaking, the switch arrangement is such that in case the linearly-variable-admittance network 281 is in a state responding to codeword ($e_1$, $e_2$, $e_3$, $e_4$) representing digital quantity $j$, then the paired admittance network 281' may respond to complementary codeword ($\bar{e}_1$, $\bar{e}_2$, $\bar{e}_3$, $\bar{e}_4$) representing that digital quantity $(2^4-1-j)$ which is the radix-minus-one complement of the first-mentioned digital quantity $j$. It is to be noted here that fixed admittance elements $g_{a1}$, $g_{b1}$, $g_{c1}$, $g_{d1}$, $g_{a1}'$, $g_{b1}'$, $g_{c1}'$, and $g_{d1}'$ of the linearly-variable-admittance networks 281 and 281' have fixed weighted admittances $g_1$, $2_{g1}$, $2^2{}_{g1}$, $2^3{}_{g1}$, $g_1$, $2_{g1}$, $2^2{}_{g1}$, and $2^3{}_{g1}$, respectively. Consequently, these admittance networks 281 and 281' have, in case codeword (0010) is supplied to both of them, resultant admittances $2^2{}_{g1}$ and $(2^4-1-2^2)_{g1}$, respectively. With a view to obtaining generic formulae for the resultant admittances of these networks 281 and 281', use will now be made of a normalized digital variable $x$ as normalized with reference to the maximum value $(2^4-1)$ of the digital quantity j and consequently given by the formula $$x=j/(2^4-1) \qquad (5)$$

and of that representative admittance $g_{M1}$ which is possessed by the linearly-variable-admittance network 281 when the normalized digital variable $x$ is equal to unity and which is accordingly given by the formula $$g_{M1}=(2^4-1)g_1 \qquad (6)$$

Then, the resultant admittances $g_{P1}$ and $g_{P1}'$ of the networks 281 and 281' are given by $$\left.\begin{aligned} &g_{P1}=g_{M1}\cdot x \\ \text{and}\quad &g_{P1}'=g_{M1}\cdot(1-x) \end{aligned}\right\} \qquad (7)$$

respectively. If the fixed admittance networks 261 and 261' have a common admittance $G_1$, and if admittances of a combination of the linearly-variable-admittance and the fixed admittance networks 281 and 261 and of another combination of the linearly-variable-admittance and the fixed admittance networks 281' and 261' are denoted by $Y_{T1}$ and $Y_{T1}'$, respectively, then the over-all admittance $Y_1$ of these four admittance networks 281, 261, 281', and 261' is given by $$\begin{aligned} Y_1&=Y_{T1}-Y_{T1}' \\ &=\frac{G_1\cdot g_{P1}}{G_1+g_{P1}}-\frac{G_1\cdot g_{P1}'}{G_1+g_{P1}'} \\ &=\frac{G_1\cdot x}{G_1/g_{M1}+x}-\frac{G_1\cdot(1-x)}{G_1/g_{M1}+(1-x)} \end{aligned} \qquad (8)$$

because the total current I flowing out of the fixed admittance networks 261 and 261' is given by $$I=E_1.Y_{T1}-E_1.Y_{T1}'=E_1.(Y_{T1}-Y_{T1}') \qquad (9)$$

The second and the third partial decoder circuits 202 and 203 are of similar construction and have similar over-all admittances $Y_2$ and $Y_3$, respectively. Therefore, in case the electromotive forces $E_1$, $E_2$, and $E_3$ are all equal in their absolute values, the over-all admittance $Y_S$ which the decoder represents to the electromotive force $$E=E_1=E_2=E_3$$

is given by the equation $$\begin{aligned} Y_S&=Y_1+Y_2+Y_3 \\ &=G_1\cdot\left(\frac{x}{G_1/g_{M1}+x}-\frac{1-x}{G_1/g_{M1}+(1-x)}\right) \\ &+G_2\cdot\left(\frac{x}{G_2/g_{M2}+x}-\frac{1-x}{G_2/g_{M2}+(1-x)}\right) \\ &+G_3\cdot\left(\frac{x}{G_3/g_{M3}+x}-\frac{1-x}{G_3/g_{M3}+(1-x)}\right) \end{aligned} \qquad (10)$$

which may be simplified, by introducing a new digital variable $y$ given by $$x=(1+y)/2$$

into $$Y_S=A_1\cdot\frac{y}{1+B_1\cdot(1-y^2)}+A_2\cdot\frac{y}{1+B_2\cdot(1-y^2)}+A_3\cdot\frac{y}{1+B_3\cdot(1-y^2)} \qquad (11)$$

where $$A_1=\frac{G_1\cdot g_{M1}}{G_1+g_{M1}},\qquad B_1=\frac{g_{M1}^2}{4G_1\cdot(G_1+g_{M1})}$$

$$A_2=\frac{G_2\cdot g_{M2}}{G_2+g_{M2}},\qquad B_2=\frac{g_{M2}^2}{4G_2\cdot(G_2+g_{M2})}$$

$$A_3=\frac{G_3\cdot g_{M3}}{G_3+g_{M3}},\ \text{and}\ B_3=\frac{g_{M3}}{4G_3\cdot(G_3+g_{M3})}$$

respectively. As will be clear from Equation 11, the decoder in FIG. 2 has a companding characteristic represented by an odd function. Thus, it is possible, according to the invention, to provide a decoder producing its decoder output as a short-circuit current and having an odd-function higher-order hyperbolic companding characteristic, which is very convenient not only for raising the signal-to-quantization-noise ratio but also for local decoders to be used in feedback-type encoders for encoding positive-and-negative-going analogue signals.

It is to be noted here that although the switches $a_1$, $b_1$, $c_1$, $d_1$, $a_2$, etc., in the variable admittance networks 151, 152, . . ., 281, 281', 282, and so on, were illustrated as contacts of relays (not shown) operated as shown by broken lines, by the corresponding code elements of a digital signal, it is possible to use electronic switches therefor so that control of the weighted-impedance-switch networks may be carried out purely electrically. Also, it is possible to provide, in place of the over-all admittance $Y_S$ given by the Equations 4 or 11, a more complicated higher-order hyperbolic over-all admittance by selecting suitable voltages for the voltages $E_1$, $E_2$, and others of the constant-voltage power sources 141, 142, . . ., 241, 241', 242, and others, or by shunting some of the variable admittance networks 151–15*m* and 251–25*m* with other fixed admittance elements, respectively, and to make some of the admittances $G_1$, $G_2$, and the like, of the fixed admittance networks 161, 162, . . ., 261, 262, and the like, infinitely great, or to short-circuit some of these networks, so as to modify the companding characteristic given by the Equations 4 or 11. Furthermore, the combination of the fixed weighted admittance elements and the switches in a weighted-impedance-switch or variable admittance network may be combined in every possible manner, provided the same has the linearly-variable-admittance feature.

While I have described above the principles of my invention in connection with specific embodiments, it is to be clearly understood that this description is made only by way of example and not as a limitation to the scope of my invention as set forth in the objects thereof, and in the accompanying claims.

What is claimed is:

1. In a nonlinear decoding device for converting a coded input signal into a decoded output signal according to a nonlinear companding characteristic, the combination comprising:

(a) a coded signal input source;

(b) a plurality of partial decoder circuits, each comprising a variable admittance network having a current input terminal, a current output terminal, and coded signal input means coupled to said coded signal input source, the admittance of said variable admittance network being variable in discrete linear steps in accordance with the coded input signal supplied to said coded signal input means, said partial decoder circuits comprising at least one constant-voltage power source connected to the current input terminals of the variable admittance networks a predetermined number of which have infinitely large admittances, and a plurality of fixed admittance networks, each connected at one end to said current output terminal of said variable admittance network; and (c) a decoded output signal utilization circuit connected to all the other ends of said fixed admittance networks.

2. The combination as set forth in claim 1, in which at least one pair of variable admittance networks is provided, the admittance of one of each pair being variable in complementary relation to the other of the pair in accordance with said coded input signal supplied to the coded signal input means thereof, and wherein the complementarialy variable admittance network is connected to a constant-voltage power source which has a voltage opposite in sign, but equal in value, to the constant-voltage power source connected to said other of said pair.

3. In a nonlinear decoding device for converting a coded input signal into a decoded output signal according to a nonlinear companding characteristic the combination comprising:

(a) a coded signal input source;

(b) a plurality of partial decoder circuits, each comprising a variable admittance network having a current input terminal, a current output terminal, and coded signal input means coupled to said coded signal input source, the admittance of said variable admittance network being variable in discrete linear steps in accordance with the coded input signal supplied to said coded signal input means, said partial decoder circuits comprising at least one constant-voltage power source connected to the current input terminals of the variable admittance networks, and a plurality of fixed admittance networks, each connected at one end to said current output terminal of said variable admittance network;

(c) a decoded output signal utilization circuit connected to all the other ends of said fixed admittance networks; and (d) the combination including at least one pair of variable admittance networks, the admittance of one in each pair being variable in complementary relation to the other of the pair in accordance with said coded input signal supplied tot he coded signal input means thereof, the complementarily variable admittance network being connected to a constant-voltage power source which has a voltage opposite in sign, but equal in value, to the constant-voltage power source connected to said other of said pair.

4. The combination as set forth in claim 3, wherein a plurality of pairs of variable admittance networks is provided and wherein the fixed admittance networks connected to a predetermined number among said pairs have infinitely high admittance.

References Cited

UNITED STATES PATENTS 2,869,115 1/1959 Doeleman et al. ------ 340—347

MAYNARD R. WILBUR, *Primary Examiner.*

W. J. KOPACZ, *Assistant Examiner.*